(12) United States Patent
Enzinger et al.

(10) Patent No.: US 10,383,434 B2
(45) Date of Patent: Aug. 20, 2019

(54) FOLDING TABLE

(71) Applicant: FACC AG, Ried im Innkreis (AT)

(72) Inventors: Sindhuja-Cheema Enzinger, Altheim (AT); Wilfried Johann Konrad, Gurten (AT)

(73) Assignee: FACC AG, Ried im Innkreis (DE)

( * ) Notice: Subject to any disclaimer, the term of this patent is extended or adjusted under 35 U.S.C. 154(b) by 0 days.

(21) Appl. No.: 15/566,502

(22) PCT Filed: Apr. 15, 2016

(86) PCT No.: PCT/AT2016/050098
§ 371 (c)(1),
(2) Date: Oct. 13, 2017

(87) PCT Pub. No.: WO2016/164953
PCT Pub. Date: Oct. 20, 2016

(65) Prior Publication Data
US 2018/0110323 A1 Apr. 26, 2018

(30) Foreign Application Priority Data

Apr. 15, 2015 (AT) .............................. A 50299/2015

(51) Int. Cl.
*A47B 5/00* (2006.01)
*A47B 5/04* (2006.01)
*B64D 11/06* (2006.01)

(52) U.S. Cl.
CPC .............. *A47B 5/006* (2013.01); *A47B 5/04* (2013.01); *B64D 11/0605* (2014.12); *B64D 11/0638* (2014.12)

(58) Field of Classification Search
CPC .......... A47B 5/00; A47B 5/04; B64D 11/0638
(Continued)

(56) References Cited

U.S. PATENT DOCUMENTS 1,809,866 A * 6/1931 Riesche .................. A47B 5/04
108/116
2,536,366 A 1/1951 Harris et al.
(Continued)

FOREIGN PATENT DOCUMENTS

| EP | 1172252 A1 | 1/2002 |
| EP | 1836927 A1 | 9/2007 |
| FR | 2802070 A1 | 6/2001 |

OTHER PUBLICATIONS

ISA European Patent Office, International Search Report Issued in Application No. PCT/AT2016/050098, dated Jul. 19, 2016, 4 pages.

*Primary Examiner* — Jose V Chen
(74) *Attorney, Agent, or Firm* — McCoy Russell LLP (57) ABSTRACT

A folding table for an aircraft comprising a supporting device for a tabletop, a pull-out device for moving the supporting device from a vertical stowing position to a horizontal usage position via a pull-out position, wherein the pull-out device has a guiding device for guiding the supporting device between the stowing position and the pull-out position, wherein the guiding device has a linear first guide track for a first guide element on the supporting device and a second guide track for a second guide element on the supporting device, which second guide track has linear and arcuate segments, wherein the supporting device is slid along the linear segment of the second guide track of the guiding device from the stowing position into the pull-out position, and is pivoted along the arcuate segment of the second guide track of the guiding device from the pull-out position into the usage position.

13 Claims, 9 Drawing Sheets

(58) Field of Classification Search
USPC .................................... 108/42, 48, 115, 152
See application file for complete search history.

(56) References Cited

U.S. PATENT DOCUMENTS

| | | | | |
|---|---|---|---|---|
| 4,159,071 A * | 6/1979 | Roca | ........................ | A47C 7/70 |
| | | | | 108/42 |
| 5,086,527 A * | 2/1992 | Takahashi | ............... | A47D 5/003 |
| | | | | 108/38 |
| 5,443,018 A * | 8/1995 | Cromwell | .............. | B60N 3/004 |
| | | | | 108/44 |
| 5,669,314 A * | 9/1997 | Grant | ........................ | A47B 5/00 |
| | | | | 108/20 |
| 5,713,404 A * | 2/1998 | Ladewig | .................. | B25H 1/04 |
| | | | | 108/42 |
| 6,520,091 B1 * | 2/2003 | Dettmers | ............... | A47B 5/006 |
| | | | | 108/42 |
| 7,963,231 B2 * | 6/2011 | Osborne | ................ | A47B 5/006 |
| | | | | 108/40 |
| 8,205,563 B2 * | 6/2012 | St. Louis | ............... | B64D 11/00 |
| | | | | 108/40 |
| 9,955,779 B2 * | 5/2018 | Hoeftberger | ............. | A47B 5/04 |
| 2003/0188672 A1 | 10/2003 | Parent et al. | | |
| 2007/0227407 A1 * | 10/2007 | Cartensen | ............... | A47B 5/006 |
| | | | | 108/33 |
| 2009/0078169 A1 | 3/2009 | Osborne et al. | | |
| 2011/0017103 A1 * | 1/2011 | Lee | ........................... | A47B 5/06 |
| | | | | 108/42 |
| 2016/0146531 A1 * | 5/2016 | Gossens | ................ | F25D 25/024 |
| | | | | 108/42 |

\* cited by examiner

Fig. 19 ically linearly. This embodiment is in particular suitable to pivot the supporting device of the folding table from the substantially vertical pull-out position into the substantially horizontal usage position, and vice versa.

FOLDING TABLE

CROSS-REFERENCE TO RELATED APPLICATIONS

The present application is a U.S. National Phase of International Patent Application Serial No. PCT/AT2016/050098, entitled "FOLDING TABLE," filed on Apr. 15, 2016. International Patent Application Serial No. PCT/AT2016/050098 claims priority to Austrian Patent Application No. A 50299/2015, filed on Apr. 15, 2015. The entire contents of each of the above-cited applications are hereby incorporated by reference for all purposes.

TECHNICAL FIELD

The invention relates to a folding table, in particular for an aircraft, comprising a supporting device for a tabletop, comprising a pull-out device for moving the supporting device for the tabletop from a substantially vertical stowing position into a substantially horizontal usage position via an in particular substantially vertical pull-out position, wherein the pull-out device has a guiding device for guiding the supporting device between the stowing position and the pull-out position.

BACKGROUND AND SUMMARY

Such a folding table is for example known from EP 1 836 927 A1. This table has a lower housing and a tabletop, which can be moved from a stowing position arranged vertically in the lower housing, into a usage position, in the case of which the tabletop is arranged substantially horizontally. The lower housing has a cover, which is folded out for pulling out the tabletop. A supporting frame for the tabletop is fastened in an articulated manner to supporting arms, which can be slid in lateral guiding rails via sliding frames. The pivot angle of the supporting frame relative to the supporting arms is limited by arcuate guides. The supporting frame can thus not be pivoted downwards past the horizontal usage position. In addition, four supporting arms are provided, the one ends of which are pivotably connected to the supporting arms, and the other ends of which are arranged so as to be capable of being slid in guides on the supporting frame. The pull-out of the table construction is supported against the force of gravity by springs.

In the prior art, the guiding of the tabletop when being pulled out is thus disadvantageously separated from the fold-down mechanism into the usage position. Separate motion sequences are thus provided, which are not very intuitive and ergonomic. The construction effort is furthermore also increased by the larger number of joints. Stability losses can further appear.

Further embodiments of folding tables are described in US 2009/0078169A1, US2003/0188672 A1, U.S. Pat. No. 2,536,366 and FR 2 802 070.

It is the object of the invention to reduce or to eliminate, respectively, the disadvantages of the prior art. This object is solved by means of a folding table comprising a supporting device for a tabletop, in particular for an aircraft, comprising a pull-out device for moving the supporting device for the tabletop from a substantially vertical stowing position into a substantially horizontal usage position via a substantially vertical pull-out position, wherein the pull-out device has a guiding device for guiding the supporting device between the stowing position and the pull-out position, wherein the guiding device has a substantially linear first guide track for a first guide element on the supporting device and a second guide track for a second guide element on the supporting device, which second guide track has a linear segment and an arcuate segment, wherein the supporting device is slid along the linear segment of the second guide track of the guiding device from the stowing position into the pull-out position and is pivoted from the pull-out position into the usage position along the arcuate segment of the second guide track of the guiding device, wherein the arcuate segment of the second guide track of the guiding device has a central angle of substantially 90°, wherein, in response to sliding the second guide element along the arcuate segment of the second guide track, the supporting device, together with the table top fastened thereto, is pivoted about the same angle of substantially 90°.

According to the invention, the guiding device has a substantially linear first guide track for a first guide element on the supporting device and a second guide track for a second guide element on the supporting device, which second guide track has a linear segment and an arcuate segment, wherein the supporting device can be slid along the linear segment of the second guide track of the guiding device from the stowing position into the pull-out position and can be pivoted from the pull-out position into the usage position along the arcuate segment of the second guide track of the guiding device.

The guiding device according to the invention thus has a first guide track, which runs in a straight line or linearly, respectively, substantially across the entire length thereof, and, on the other hand, a second guide track, which has a linear segment and, directly following the latter, an arcuate segment. In the first guide track, a first guide element is supported, which is coupled to the supporting device, in particular a supporting arm of the supporting device, at a first location. In the second guide track, a second guide element is supported, which is coupled to the supporting device, in particular the supporting arm of the supporting device, at a second location. The distance between the first location and the second location is preferably substantially constant. In response to the pull-out process, the first and second guide element wander along the first or second guide track, respectively. When the second guide element reaches from the linear segment into the arcuate segment, the supporting device is pivoted according to the course of the arcuate segment of the second guide track. The position of the supporting device is determined for each pivot angle due to the simultaneous guiding of the supporting device via the first guide element at the linear first guide track. Advantageously, a positive guiding of the supporting device for the tabletop from the stowing position via the pull-out position into the usage position (and vice versa) is thus attained. The embodiment according to the invention is characterized by a parts-saving and thus cost-efficient design. The pull-out or folding up process, respectively, can furthermore be designed in a intuitive and ergonomic manner. A particularly stable embodiment can further be attained. The embodiment according to the invention is furthermore in particular suitable to accomplish the fold-out of the tabletop by means of a single drive unit for the pull-out and pivoting process.

To effect a positive guiding of the supporting device between the substantially vertical pull-out position and the substantially horizontal usage position of the tabletop, it is favorable, when the arcuate segment of the second guide track of the guiding device has a central angle of substantially 90°. The arcuate segment of the second guide track thus describes an angle of substantially 90°, while the corresponding segment of the first guide track runs substantially linearly. In response to sliding the second guide element along the arcuate segment of the second guide track, the supporting device, together with the table leaf fastened thereto, is pivoted about the same angle of substantially 90°.

To support the tabletop on opposite sides, it is advantageous, when the pull-out device has two guiding devices for guiding one supporting arm each of the supporting device. Both guiding devices are preferably embodied substantially identically. On the one hand, each guiding device thus has a first guide track comprising a linear course, in which a first guide element, which is connected to the supporting device, can be slid. Each guiding device furthermore has a second guide track, in which a second guide element, which is connected to the supporting device, can be slid. The second guide track in each case has an arcuate or curved second segment, respectively, by means of which the pivoting of the supporting device between the pull-out position and the usage position is accomplished. The first and second guide element are connected to the supporting arm of the supporting device at different longitudinal positions. The positive guiding of the supporting device or of the tabletop fastened thereto, respectively, can thus be attained.

With regard to a structurally simple embodiment, which can be produced in a cost-efficient manner, it is advantageous, when a plate element, on which the first and the second guide track are embodied, is provided as guiding device. The first and the second guide track are preferably provided adjacently on the plate element. The first guide track is preferably formed by an elongated passage opening of the plate element comprising a substantially constant width, so that the first guide element protrudes from the side of the supporting device through the passage opening onto the side of the plate element, which faces away from the supporting device. In contrast, the second guide track can be formed by a depression of the plate element, in which depression the second guide element, in particular a guide pin, which is rigidly connected to the supporting device, is guided.

For automatically pulling out and pivoting the tabletop from the stowing position, it is favorable, when the guiding device is connected to a drive unit, preferably an electric motor, by means of which the supporting device can be moved from the stowing position to the usage position via the pull-out position. It is particularly preferred, when a single drive unit is provided in order to initially slide the supporting device from the stowing position into the pull-out position and then to pivot the supporting device from the pull-out position into the usage position. This embodiment is made possible in that the guiding device initially effects a positive guiding of the supporting device along the linear segments of the first and second guide track and then along the arcuate segment of the second guide track, while the first guide track continuous its linear course.

According to a preferred embodiment, the drive unit is equipped to move the first guide element along the first guide track of the guiding device, wherein the second guide element is preferably guided passively along the second guide track of the guiding device. In the case of this embodiment, the first guide element is driven, whereas the second guide element is guided passively, i.e. without its own drive, along the second guide track.

To provide for the pull-out and pivoting of the tabletop by means of a particularly simple, reliable drive unit, it is favorable, when the drive unit is equipped to set the first guide element into rotation, wherein, on the supporting device, the first guide element is connected to a power transmission element, by means of which the rotation of the first guide element can be converted into a linear movement of the first guide element along the first guide track. The drive unit is thus connected to the first guide element, which, in the driven state, performs a rotation. The drive unit is preferably located directly on the first guide element, which is embodied as drive shaft in this embodiment. According to a preferred embodiment, two guiding devices are provided on opposite sides of the folding table, wherein the first guide element, which is embodied as drive shaft, is used for both guiding devices. In the case of this embodiment, it is furthermore favorable, when the supporting device, in particular a supporting arm of the supporting device, is rotatably connected to the first guide element. In the case of this embodiment, a power transmission element is further provided, which absorbs the rotation of the first guide element and transforms it into a sliding of the first guide element along the first guide track.

The sliding of the first guide element can be accomplished in a particularly safe and reliable manner, when a gearwheel is provided as power transmission element, which gearwheel meshes with a toothed rack in response to the movement of the first guide element along the first guide track, wherein the toothed rack preferably has substantially the same length as the first guide track of the guiding device. In the case of this embodiment, the gearwheel is preferably connected to an end of the first guide element in a rotatably fixed manner. It is particularly preferred, when the first guide element is used for two guiding devices on opposite sides, wherein each end of the first guide element is connected to a gearwheel, which runs on a corresponding toothed rack. The first guide element preferably passes through a passage opening of the guiding device, which passage opening forms the first guide track, to the side of the guiding device, which faces away from the supporting device. In the case of this embodiment, the end of the first guide element, which passes through, is connected in a rotatably fixed manner to the gearwheel, which engages with the correspondingly formed toothed rack. In the driven state of the first guide element, the gearwheel thus wanders upwards or downwards, respectively, along the toothed rack, depending on the drive direction.

To be able to accomplish the move between the stowing position and the usage position of the tabletop with the smallest possible power drain of the drive unit, a spring element, which counteracts the pivoting of the supporting device in the direction of the usage position and/or which supports the pivoting of the supporting device from the usage position in the direction of the pull-out position, is provided according to a particularly preferred embodiment. In response to the pivoting of the supporting device from the pull-out position into the usage position, the spring element is tensioned under the influence of the dead weight of the supporting device or of the tabletop, respectively. In the usage position, the spring element is thus present in the tensioned state. In response to the pivoting of the tabletop from the usage position into the pull-out position, the stored tensioning energy of the spring element is released, in order to support the lifting of the supporting device along with the tabletop. In the pull-out position, the spring element is preferably present in the relaxed state.

A further spring can furthermore be provided, by means of which the sliding of the supporting device from the stowing position into the pull-out position is supported. In response to the sliding of the supporting device from the pull-out position into the stowing position, the further spring is tensioned. A helical spring is preferably provided as further spring, which is tensioned or relaxed, respectively, by means of a rotation of the first guide element.

In order to provide the spring force in response to folding out or folding in the tabletop, respectively, in sections, it is favorable, when the spring element is connected to a pivot lever, which can be pivoted against the force of the spring element by means of the first or the second guide element on the supporting device. On one end, the pivot lever is supported about a stationary pivot axis, which preferably extends substantially in the horizontal direction. The one end of the spring element, the other end of which is supported in a stationary manner, engages on the other end of the pivot lever. During its guided movement, the first or the second guide element thus strikes against the pivot lever in the direction of the usage position. In the struck state, the pivot lever is pushed upwards by means of the first or second guide element, respectively, wherein the spring element is tensioned with the support of the weight of the supporting device along with the tabletop. In response to the pivoting of the supporting device together with the tabletop from the usage position into the pull-out position, the tensioning energy of the spring element is transmitted via the pivot lever to the first or second guide element, respectively, so that the lifting of the supporting device together with the tabletop is supported. In the phase of highest load, the drive unit can thus be supported with the pretensioned pivot lever as a result of the dead weight of the supporting device or of the tabletop, respectively. This embodiment has the advantage that the maximum drive force, which is to be provided by the drive unit, can be reduced. A comparatively weak drive unit can thus be used in order to pivot the supporting device together with the tabletop upwards from the usage position into the pull-out position. During the sliding of the supporting device between the storage position and the pull-out position, the spring element is preferably present in the relaxed state.

According to a particularly preferred embodiment, the distance between the point of application of the first or second guide element, respectively, on the pivot lever and the pivot axis of the pivot lever is larger in the case of a first pivot angle of the supporting device in response to pivoting from the substantially vertical pull-out position in the direction of the substantially horizontal usage position, than in the case of a second pivot angle of the supporting device. In the case of this embodiment, the force transmission from the pivot lever to the first or second guide element, respectively, which struck said pivot lever, is thus a function of the pivot angle of the supporting device. The variable force transmission results from the lever relationships between the pivot leer and the first or second guide element, respectively, which engage therewith. The larger the distance between the point of application of the first or second guide element, respectively, on the pivot lever and the pivot axis thereof, the smaller the torque, which the pivot lever transmits to the first or second guide element, respectively. In response to pivoting the supporting device upwards from the usage position, the drive unit can thus be maximally supported specifically in the phase of highest load effect.

For this purpose, it is furthermore favorable, when the distance between the point of application of the first or second guide element, respectively, on the pivot lever and the pivot axis of the pivot lever is larger in the case of a third pivot angle of the supporting device in response to pivoting from the substantially vertical pull-out position in the direction of the substantially horizontal usage position, than in the case of the second pivot angle of the supporting device. In response to pivoting the supporting device from the pull-out position into the usage position, the pivot lever in the struck state of the first or second guide element, respectively, is pivoted against the force of the spring element, wherein the arm of the force, which is formed between the first or second guide element, respectively, and the pivot axis of the pivot lever, varies, depending on the pivot angle of the supporting device.

In the case of this embodiment, it is further preferably provided for the first pivot angle of the supporting device to be smaller than the second pivot angle of the supporting device, which is smaller than the third pivot angle of the supporting device. In response to pivoting the supporting device from the pull-out position into the usage position, the supporting device consecutively runs through the first pivot angle, the second pivot angle, and the third pivot angle, wherein the force transmission from the spring-loaded pivot lever to the first or second guide element, respectively, reaches a maximum with the second pivot angle.

To return the pivot lever into the first angularity in response to folding up (folding in) the supporting device, it is favorable, when the pivot lever is pretensioned in the direction of a first angularity, which corresponds to the first pivot angle of the supporting device, by means of the spring element, wherein a stop element for limiting the pivoting of the pivot lever to the first angularity is provided.

So as to be able to adjust the spring characteristic in response to the pull-out or pivoting process, respectively, it is favorable, when the stop element is connected to a control element, in particular an adjusting screw, by means of which the first angularity of the pivot lever can be adjusted.

If at least two fastening locations, which are spaced apart from one another in the longitudinal direction of the first guide track, are provided for the selective arrangement of the pivot axis of the pivot lever, the point in time, at which the force transmission from the pivot lever to the first or second guide element, respectively, starts, can be changed.

According to a first preferred embodiment, the substantially linear first guide track of the guiding device and the linear segment of the second guide track of the guiding device extend substantially in the vertical direction.

For the purpose of this disclosure, the information about location and direction, such as "horizontal", "vertical", "upper", "lower", etc., refers to the assembled usage state of the folding table, when being used in an aircraft, it refers to the horizontal bottom surface of the aircraft.

In the case of this embodiment, it is favorable, when a cladding element is provided, which can be pivoted between a position, which closes a pull-out opening for the supporting device, and a position, which releases the pull-out opening for the supporting device. The cladding element can preferably be pivoted about a substantially horizontal pivot axis. The cladding element can form the upper side of a housing, by means of which the folding table is installed in particular into an armrest or a side cladding of an aircraft.

To design the operation to be particularly simple, a switch for activating the drive unit is preferably provided, which switch can be operated by pivoting the cladding element. In the case of this embodiment, the cladding element can strike against the switch or can be lifted off it, respectively, in order to initiate the pull-out process, starting in the stowing position. Vice versa, the switch can be operated via the cladding element, in order to initiate the fold-in process, starting in the usage position. The switch can be connected to the drive unit via a control unit for this purpose.

According to an alternative preferred embodiment, the pull-out device has a tilt mechanism for tilting the guiding device for the supporting device from the substantially vertical stowing position into an initial position, which is inclined relative thereto. In the case of this embodiment, a fixed or non-pivotable cladding element, respectively, can be provided on the upper side of the folding table, which cladding element, in the assembled operating state, is preferably arranged substantially horizontally. In order to bring the folding table from the stowing position into the usage position, the tilt mechanism, by means of which the at least one guiding device is tilted about a preferably substantially horizontal pivot axis, is initially activated. The supporting device can then be moved from the stowing position into the usage position via the pull-out position by means of the drive unit, wherein, in the tilted state, the supporting device together with the tabletop can be guided past the immovable cladding element. In the case of this embodiment, a switch can also be provided, which is connected to the drive unit via a control unit. For example, a push switch can be provided on the fixed cladding element.

BRIEF DESCRIPTION OF THE FIGURES

The invention will be discussed in more detail below by means of preferred exemplary embodiments, to which it is not to be limited, however. In the drawing.

DETAILED DESCRIPTION

Figure 1:
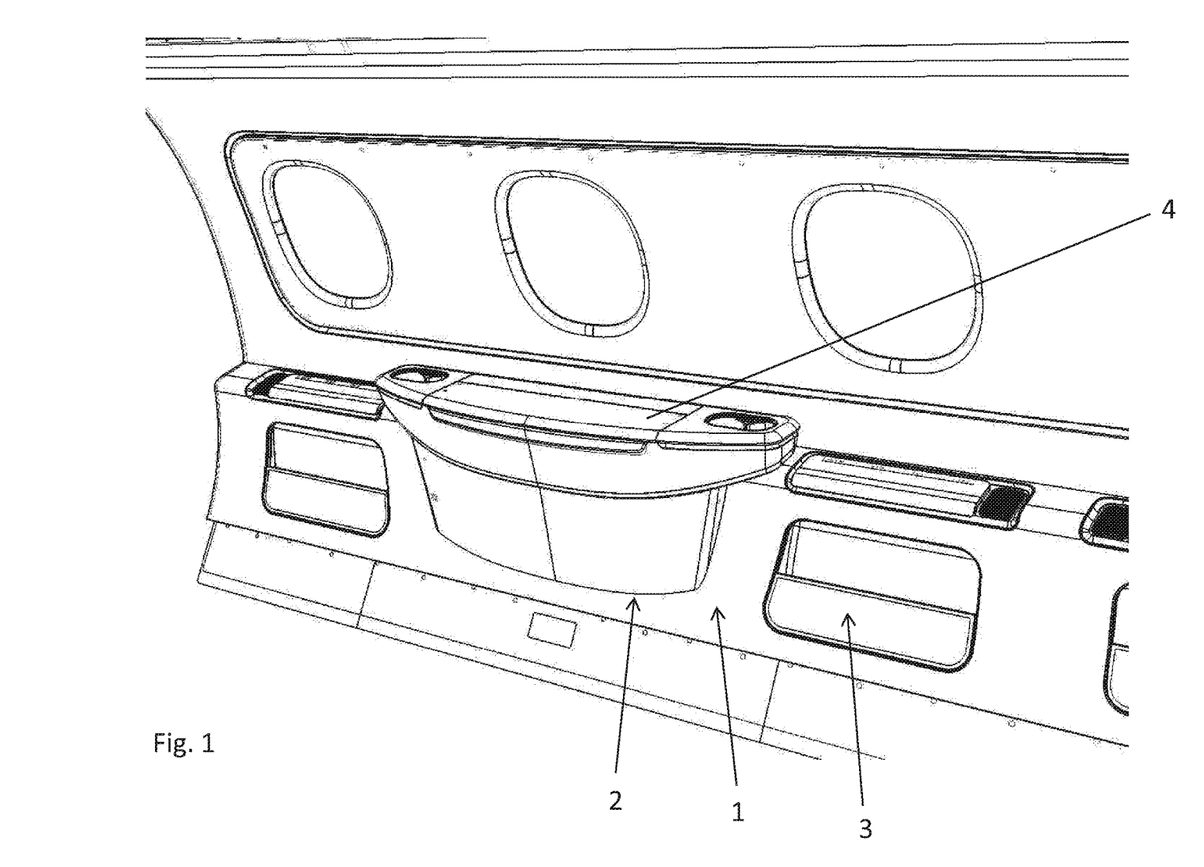
FIG. 1 shows a view of a folding table according to the invention in the installed state in a side cladding of an aircraft.

FIG. 1 shows a folding table 1, which is installed into a side cladding 2 of an aircraft 3. In the shown stowing position, the folding table 1 is completely hidden in the side cladding 2. The side cladding 2 has various cladding elements, wherein a cladding element 4 on the upper side can be pivoted about a horizontal pivot axis, in order to release or to close, respectively, a pull-out opening 5 for pulling out the folding table 1. The folding table 1 has a tabletop 6, which, in the shown embodiment, has a front part 7 and a rear part 8. The front part 7 and the rear part 8 of the tabletop 6 are connected to one another via hinges, wherein the front part 7 can be folded by 180° to the rear part 8.

As can be seen from FIGS. 2 to 10, the tabletop 6 is attached to a supporting device 9, which has a supporting arm 10 each on opposite sides of the tabletop 6. The supporting arms 10 are fixed to the bottom side of the tabletop 6 (i.e. located opposite the usage surface of the tabletop 6). To move the supporting device 9 for the tabletop 6 from the stowing position, in which the tabletop 6 is arranged substantially vertically, into a usage position, in which the tabletop 6 is arranged substantially horizontally, a pull-out device 11, which will be discussed in more detail below, is provided. The pull-out device 11 has a guiding device 12, by means of which the supporting device 9 is guided during the entire fold-out process, i.e. from the stowing position into the usage position via the pull-out position. In order to evenly lift the folding table 1 on both sides, the pull-out device 11 has two guiding devices 12 for guiding one supporting arm 10 each of the supporting device 9.

Figure 8:
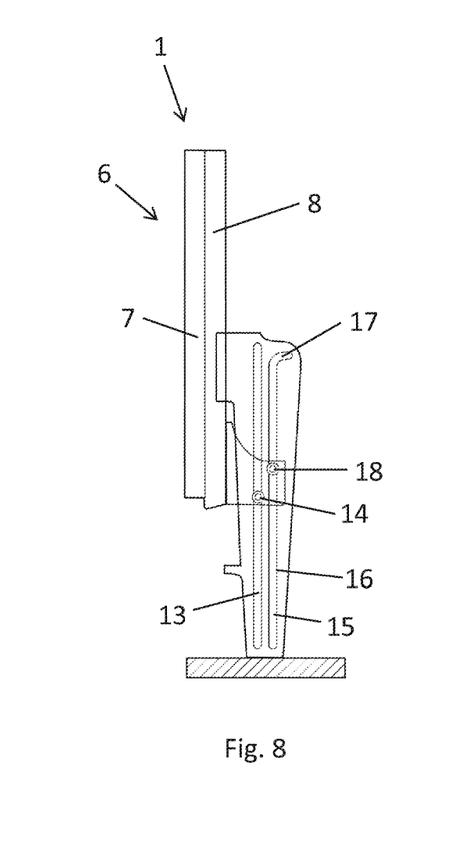
FIGS. 8 to 10 show schematic side views of the folding table during the pull-out process.
Figure 9:
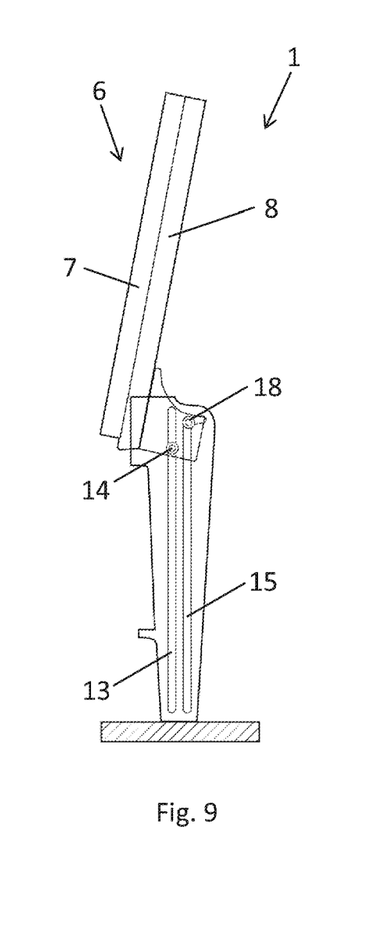
Figure 10:
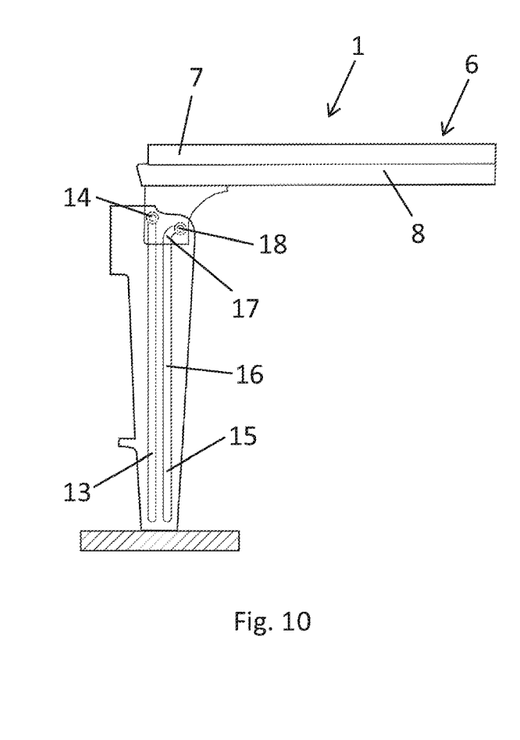

As can in particular be seen from FIGS. 8 to 10, the guiding device 12 has a straight-lined or linear first guide track 13, respectively, in which a first guide element 14 is guided on the supporting device 9. Adjacent to the first guide track 13, the guiding device 12 furthermore has a second guide track 15, which consists of a linear segment 16 and of a directly following arcuate segment 17. The supporting device 9 is connected to a second guide element 18, which is guided along the second guide track 15. When in use, the supporting device 9 is initially slid upwards into the pull-out position, starting in the stowing position, along the linear segment 16 of the second guide track 15 of the guiding device 12, and is then pivoted from the pull-out position into the usage position along the arcuate segment 17 of the second guide track 15 of the guiding device 12.

As can further be seen from FIGS. 8 to 10, the arcuate segment 17 of the second guide track 15 of each guiding device 12 has a central angle of substantially 90°, which corresponds to the pivot angle of the supporting device 9 from the pull-out position into the usage position. In the shown embodiment, each guiding device 12 is formed by a plate element 19, on which the first 13 and the second guide track 15 are embodied in one piece.

Figure 2:
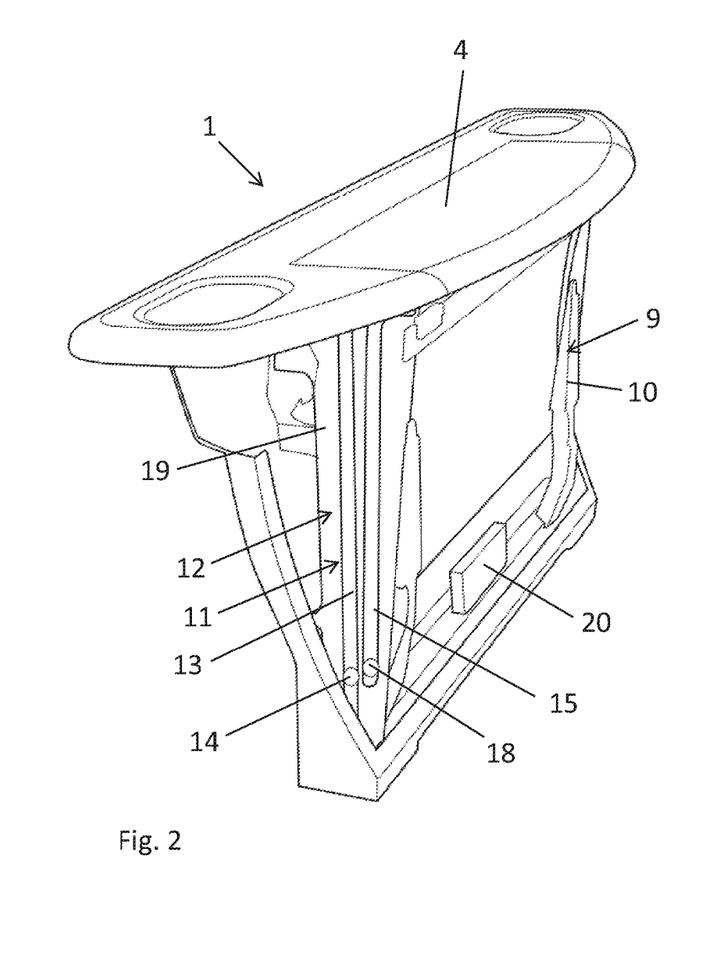
FIG. 2 shows a view of the folding table according to FIG. 1 (without the side cladding), wherein a supporting device for a two-part table flap is arranged in a vertical stowing position.
Figure 3:
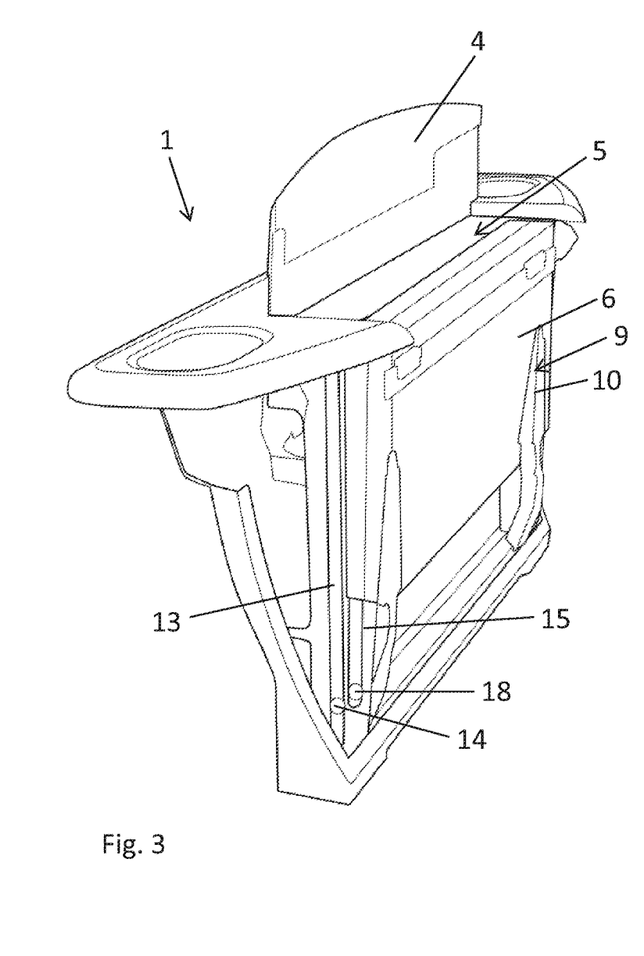
FIG. 3 shows a view of the folding table according to FIGS. 1, 2, wherein an upper cladding element of the folding table for triggering the pull-out process has been folded upwards.
Figure 4:
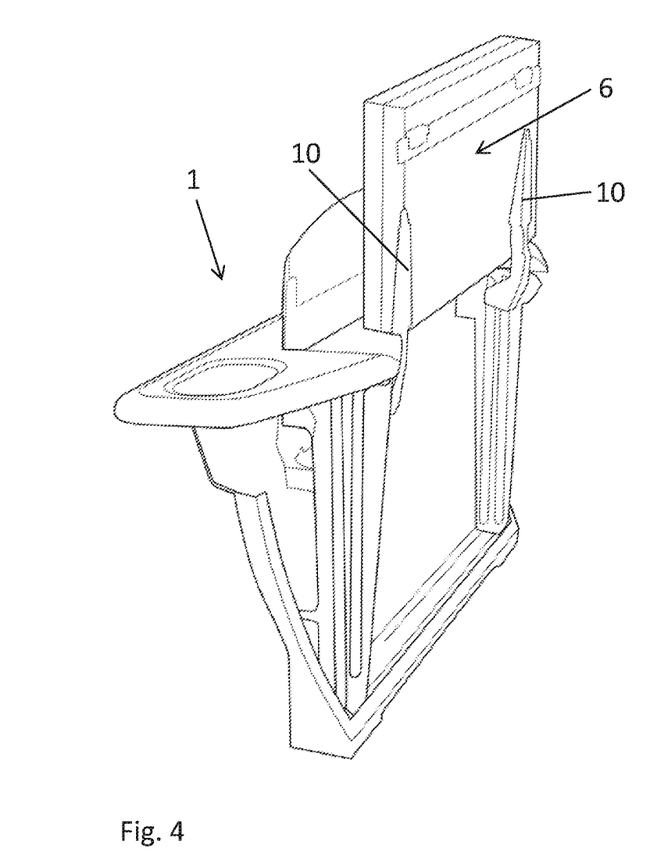
FIG. 4 shows a view of the folding table according to FIGS. 1 to 3, wherein the supporting device together with the tabletop has been slid upwards into a vertical pull-out position.
Figure 5:
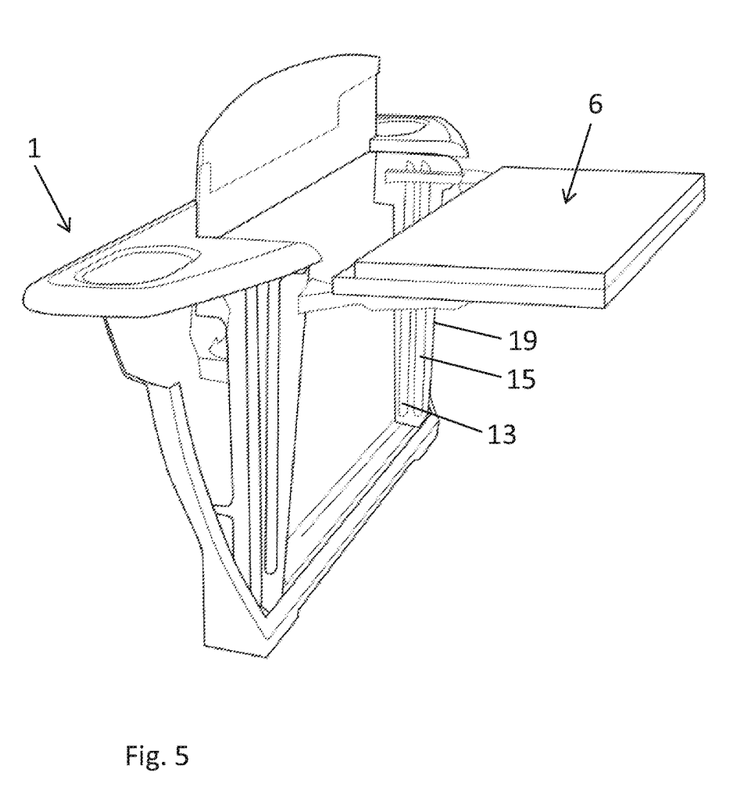
FIG. 5 shows a view of the folding table according to FIGS. 1 to 4, wherein the supporting device together with the tabletop has been folded downwards into a horizontal usage position.
Figure 6:
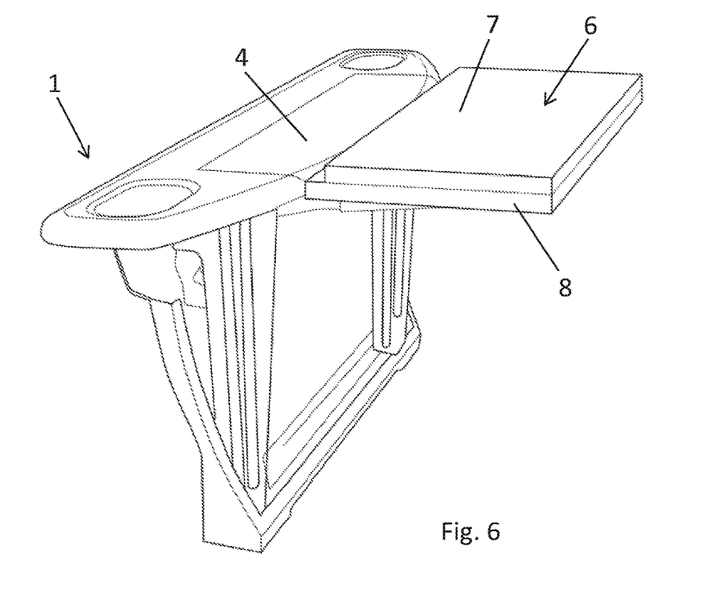
FIG. 6 shows a view of the folding table according to FIGS. 1 to 5, wherein the upper cladding element has been folded downwards.
Figure 7:
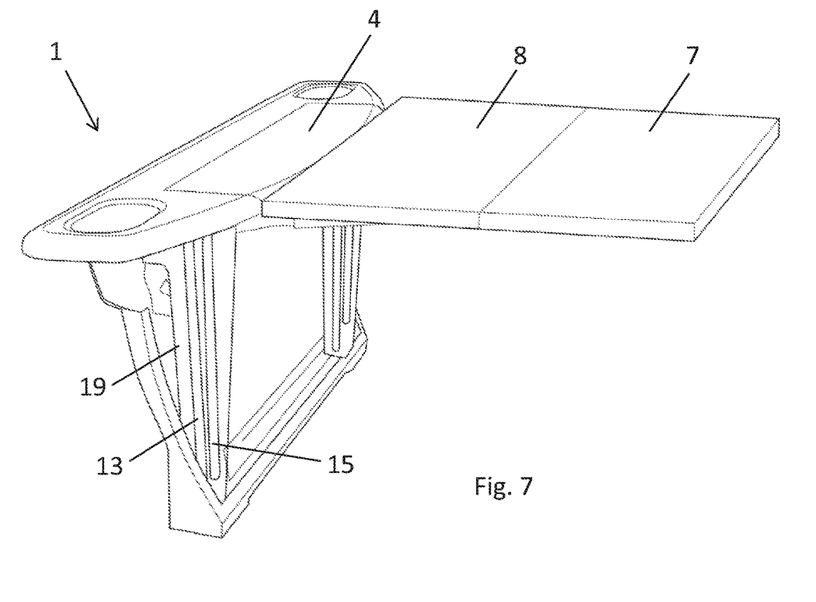
FIG. 7 shows a view of the folding table according to FIGS. 1 to 6, wherein the tabletop has been folded out.
Figure 11:
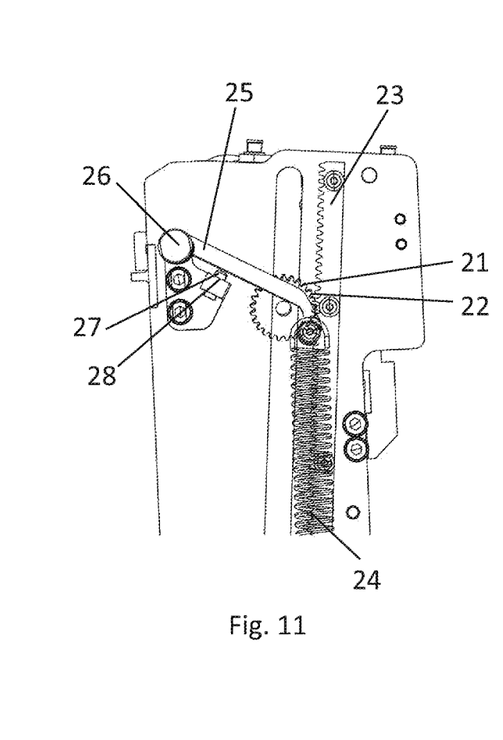
FIGS. 11 to 13 show detailed views of a guiding device of the folding table in different stages in response to the pivoting of the supporting device together with the tabletop from the pull-out position into the usage position.
Figure 12:
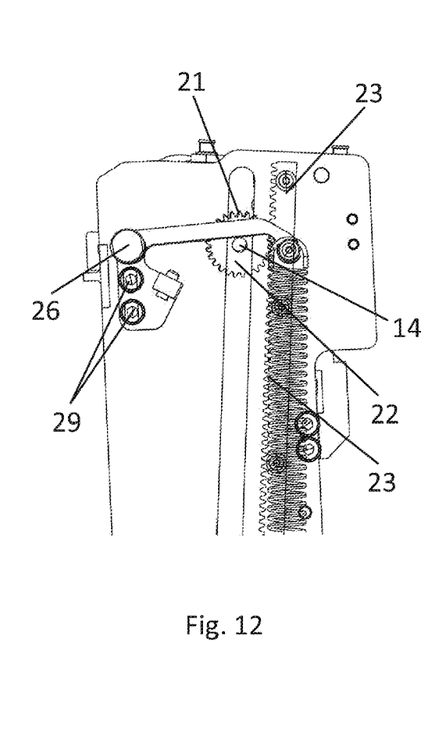
Figure 13:
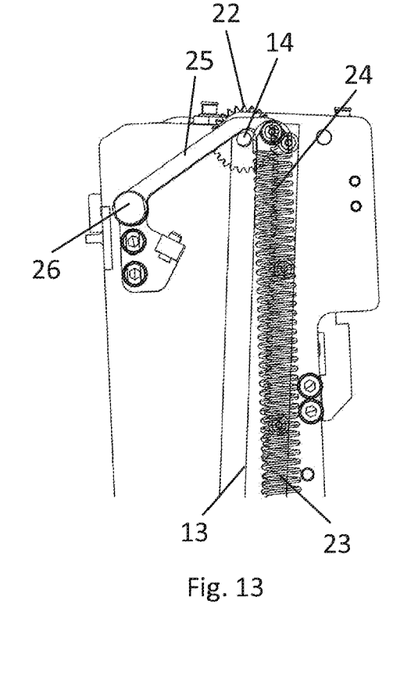
Figure 14:
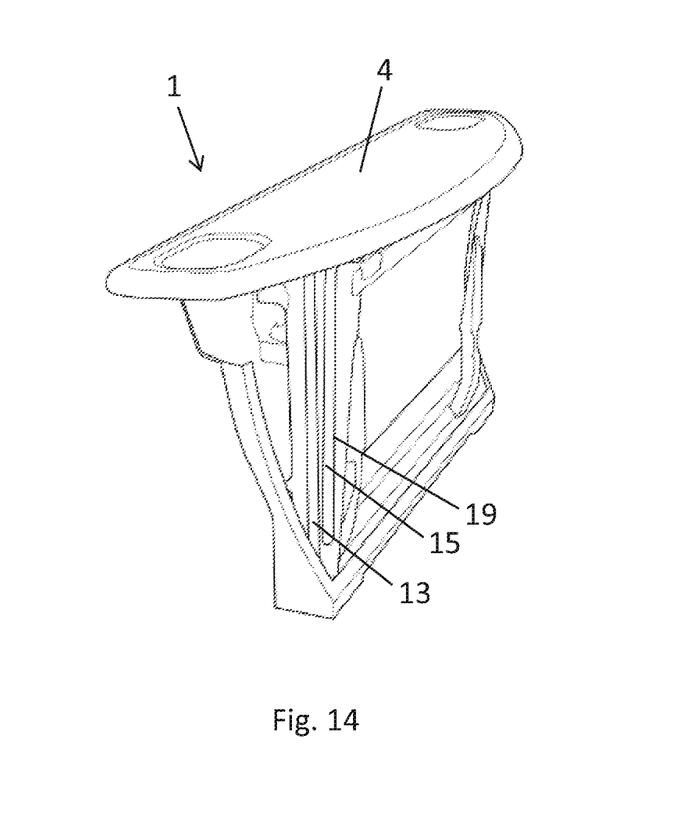
FIGS. 14 to 19 show a view of a further embodiment of the folding table according to the invention, which folding table is initially brought from the stowing position (FIG. 14) into a tilted initial position (FIG. 15) in response to the fold-out process, is then slid upwards into a pull-out position (FIG. 16), is folded into an intermediate position (FIG. 17), is then tilted into the usage position (FIG. 18), wherein the tabletop is finally folded out (FIG. 19).

As can be seen from FIG. 2 (schematically), the guiding device 12 is connected to a drive unit 20 (not marked in FIG. 3 et seqq.), by means of which the supporting device 9 can be moved from the stowing position into the usage position via the pull-out position. In the shown embodiment, the drive unit 20 is formed by means of an individual electric motor, which is equipped to move the first guide element 14 along the first guide track 13 of the guiding device 12. The second guide element 18 is meanwhile passively guided along the second guide track 15 of the guiding device 12. The drive unit 20 is coupled to the first guide element 14 in such a way that the first guide element 14 is set into rotation. As can be seen in FIGS. 11-13, the first guide element 14 is connected to a force (power) transmission element 21, by means of which the rotation of the first guide element 14 is converted into a linear movement of the first guide element 14 along the first guide track 13. In the shown embodiment, a gearwheel 22, which is connected to the free end of the first guide element 14 in a rotatably fixed manner, is provided as force transmission element 21, which is guided through the first guide track 13 to the side of the guiding device 12 which faces away from the drive unit 20. The gearwheel 22 runs on a stationary toothed rack 23, which substantially has the same length as the first guide track 13 of the guiding device 12.

As can further be seen from FIGS. 11 to 13, the folding table 1 also has a spring element 24, which, in response to being folded out, counteracts the pivoting of the supporting device 9 in the direction of the usage position, and which, in response to being folded in, supports the pivoting of the supporting device 9 from the usage position in the direction of the pull-out position. In the shown embodiment, a helical spring is provided as spring element 24. The one end of the spring element 24 is supported in a stationary manner. The other end of the spring element 24 is connected to a pivot lever 25, which can be pivoted against the force of the spring element 24 by means of the first guide element 14 on the supporting device 9.

As can further be seen from FIGS. 11 to 13, the distance between the point of application of the first guide element 14 on the pivot lever 25 and the pivot axis 26 of the pivot lever 25 is larger in the case of a first pivot angle of the supporting device 9 while pivoting from the vertical pull-out position in the direction of the horizontal usage position, than in the case of a second pivot angle of the supporting device 9. The distance between the point of application of the first guide element 14 on the pivot lever 25 and the pivot axis 26 of the guide lever 25 in the case of a third pivot angle of the supporting device 9 while pivoting from the vertical pull-out position in the direction of the horizontal usage position is furthermore larger than in the case of the second pivot angle of the supporting device 9. When the folding table 1 is folded out, the supporting device 9 consecutively passes through the first pivot angle, second pivot angle and third pivot angle. In the position according to FIG. 5, the distance between the axis of rotation of the first guide element 14 and the pivot axis 26 of the pivot lever 25 is minimal, whereas the distance between the axis of rotation of the first guide element 24 and the free end of the pivot lever 25, with which the spring element 24 engages, is maximal. Due to this lever ratio, the force transmission from the pivot lever 25 to the first guide element 14 is maximal in this position.

As can further be seen from FIGS. 11 to 13, the pivot lever 25 is pretensioned in the direction of a first angularity, which corresponds to the first pivot angle of the supporting device, by means of the spring element 24. To limit the pivoting of the pivot lever 25 to the first angularity, a stop element 27 is provided. The stop element 27 is connected to a control element 28 in the form of an adjusting screw, by means of which the first angularity of the pivot lever 25 can be adjusted, depending on the application. A plurality of, in the shown embodiment three, fastening locations 29, which are spaced apart from one another in the longitudinal direction of the first guide track 13, for selectively arranging the pivot axis 26 of the pivot leer 25, are furthermore provided.

In the embodiment of FIGS. 1 to 10, the linear first guide track 13 of the guiding device 12 and the linear segment 16 of the second guide track 15 of the guiding device 12 extends substantially in the vertical direction, wherein the guiding device 12 is arranged in a stationary manner. In the case of this embodiment, the cladding element 4 can be pivoted between a position, which closes a pull-out opening 30 for the supporting device 9, and a position, which releases the pull-out opening 5 for the transporting device 9. To activate the drive unit 20, a switch is provided, which can be operated by pivoting the cladding element 4.

Figure 15:
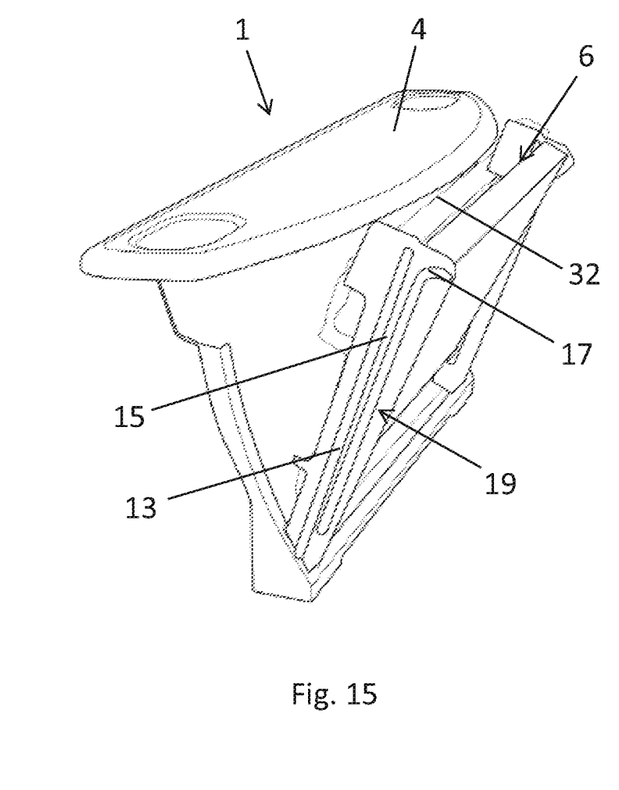
Figure 16:
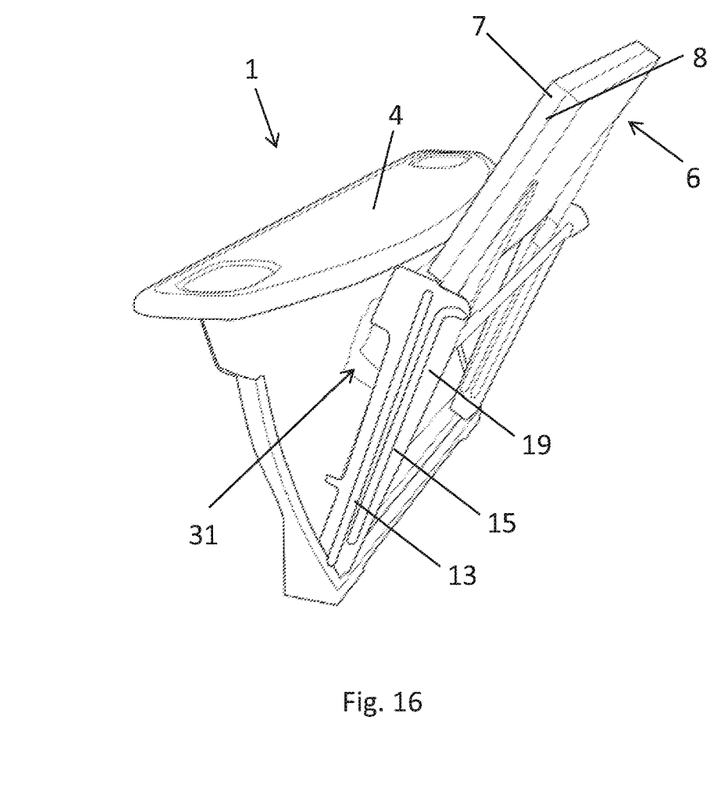
Figure 17:
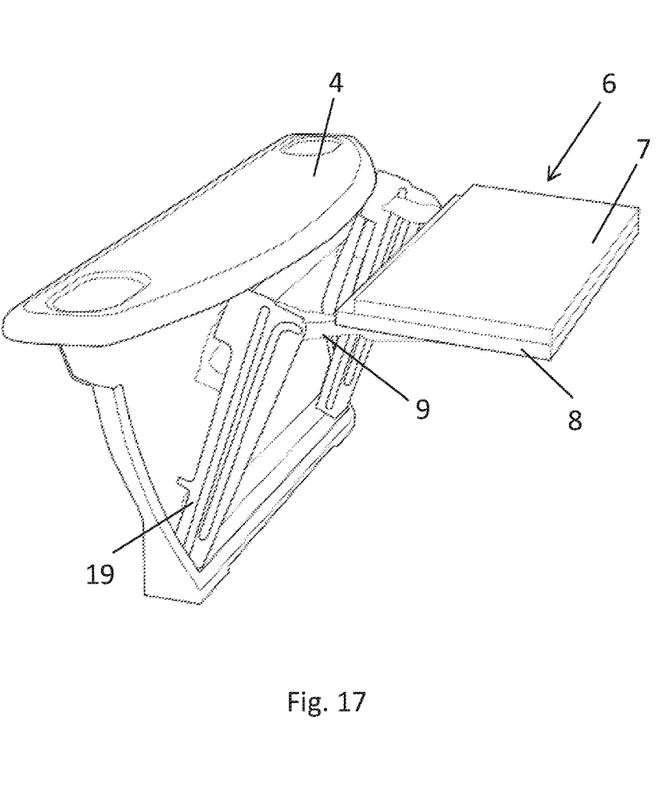
Figure 18:
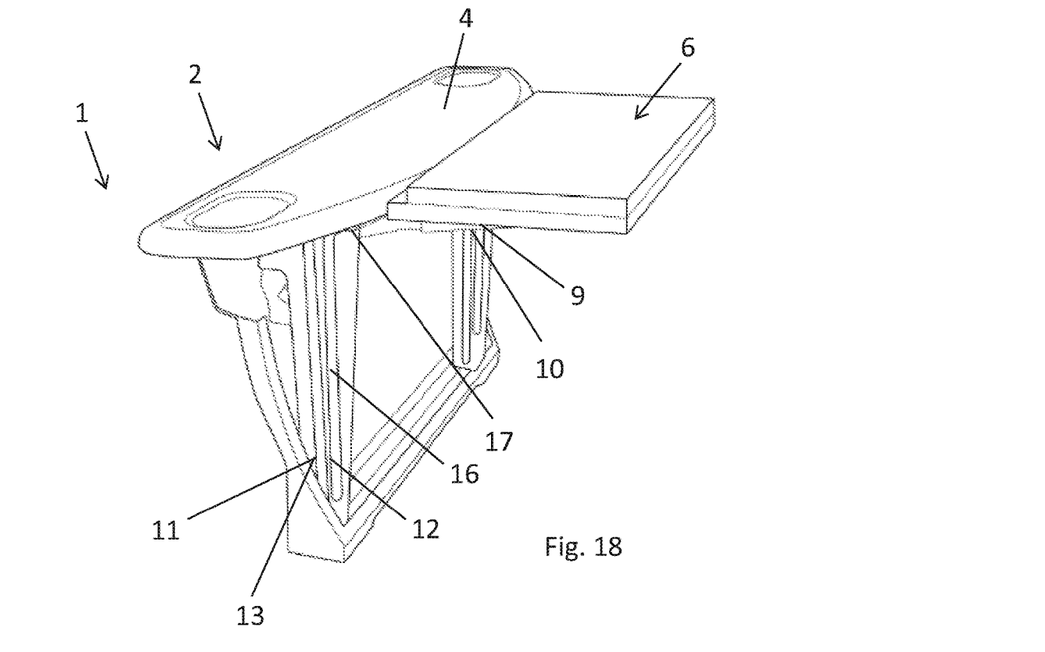
Figure 19:
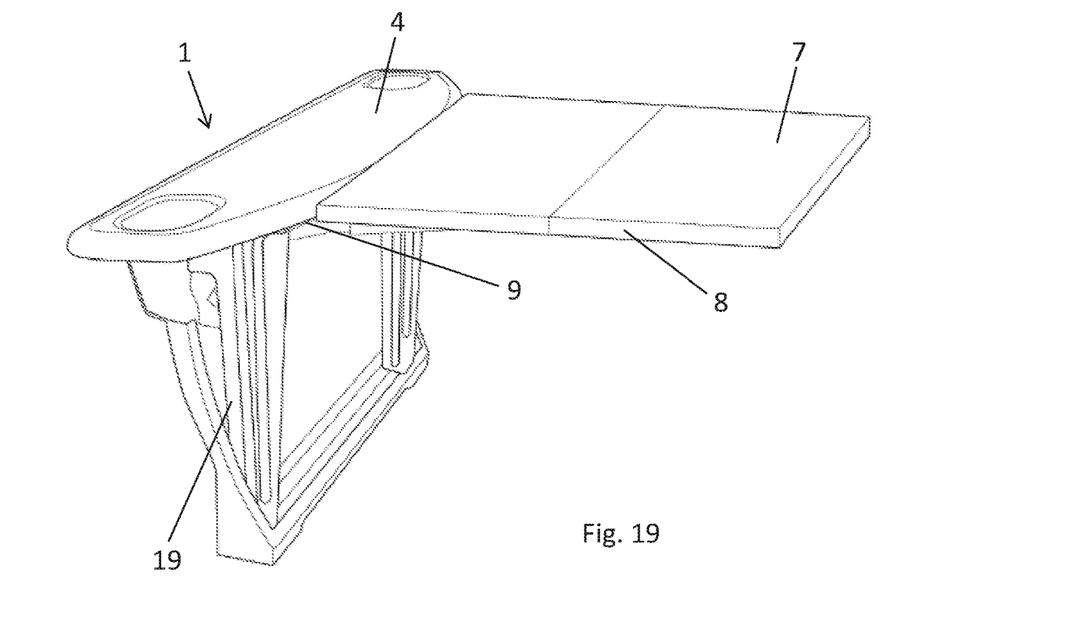

In the embodiment of FIGS. 14 to 19, the pull-out device 11, in contrast, has a tilt mechanism 32 (which is only marked schematically), for tilting the guiding device 12 for the supporting device 9 from the substantially vertical stowing position (see FIG. 14) into an initial position, which is inclined thereto (see FIG. 15). In the case of this embodiment, the cladding element 4 is arranged so as to be immovable or stationary, respectively. In the tilted position, the folding table 1 is guided past the cladding element 4 into the pull-out position (see FIG. 16), in which the supporting device or the tabletop, respectively, is arranged substantially vertically, i.e. inclined only about the tilt angle of the tilt mechanism 32. The tabletop 6 is then initially tilted into an intermediate position (see FIG. 17), before the guiding device 12 is tilted back into the vertical usage position (see FIG. 18). The two-part tabletop 6 is finally folded apart (see FIG. 19).

The invention claimed is:

1. A folding table comprising:
a tabletop, with a supporting device for the tabletop, comprising:
a pull-out device for moving the supporting device for the tabletop from a substantially vertical stowing position into a substantially horizontal usage position via a substantially vertical pull-out position, wherein the pull-out device has a guiding device for guiding the supporting device between the substantially vertical stowing position and the substantially vertical pull-out position, wherein the supporting device comprises a supporting arm on each of two opposite sides of the tabletop, wherein the supporting arms are fixed to a bottom side of the tabletop, wherein the guiding device has a substantially linear first guide track for a first guide element on the supporting device and a second guide track for a second guide element on the supporting device, wherein the second guide track has a linear segment and an arcuate segment, wherein the supporting device is slid along the linear segment of the second guide track of the guiding device from the substantially vertical stowing position into the substantially vertical pull-out position and is pivoted from the substantially vertical pull-out position into the substantially horizontal usage position along the arcuate segment of the second guide track of the guiding device, wherein the arcuate segment of the second guide track of the guiding device has a central angle of substantially 90°, and wherein, in response to sliding the second guide element along the arcuate segment of the second guide track, the supporting device, together with the tabletop fastened thereto, is pivoted about the same angle of substantially 90°;
wherein a spring element is provided, which counteracts the pivoting of the supporting device in a direction of the substantially horizontal usage position and/or which supports the pivoting of the supporting device from the substantially horizontal usage position in a direction of the substantially vertical pull-out position; and
wherein the spring element is connected to a pivot lever, which is pivoted against a force of the spring element by means of the first guide element or the second guide element on the supporting device, wherein the first guide element or the second guide element strikes against the pivot lever and an end of the spring element engages with an end of the pivot lever.

2. The folding table according to claim 1, wherein the pull-out device has two guiding devices, wherein each of the two guiding devices is for guiding one of the supporting arms in the supporting device, and wherein the folding table is for an aircraft.

3. The folding table according to claim 1, wherein a plate element is provided as the guiding device, and wherein on the plate element the first and second guide tracks are embodied.

4. The folding table according to claim 1, wherein a distance between a point of application of the first guide element or the second guide element, respectively, on the pivot lever and a pivot axis of the pivot lever is larger in the case of a first pivot angle of the supporting device in response to pivoting from the substantially vertical pull-out position in the direction of the substantially horizontal usage position, than in the case of a second pivot angle of the supporting device.

5. The folding table according to claim 4, wherein the distance between the point of application of the first guide element or the second guide element, respectively, on the pivot lever and the pivot axis of the pivot lever is larger in the case of a third pivot angle of the supporting device in response to pivoting from the substantially vertical pull-out position in the direction of the substantially horizontal usage position, than in the case of the second pivot angle of the supporting device.

6. The folding table according to claim 5, wherein the first pivot angle of the supporting device is smaller than the second pivot angle of the supporting device, which is smaller than the third pivot angle of the supporting device.

7. The folding table according to claim 4, wherein the pivot lever is pretensioned in a direction of a first angularity, which corresponds to the first pivot angle of the supporting device, by means of the spring element, wherein a stop element for limiting the pivoting of the pivot lever to the first angularity is provided.

8. The folding table according to claim 7, wherein the stop element is connected to a control element by means of which the first angularity of the pivot lever is adjusted, wherein the control element is an adjusting screw.

9. The folding table according to claim 4, wherein at least two fastening locations are provided, which are spaced apart from one another in a longitudinal direction of the first guide track, for a selective arrangement of the pivot axis of the pivot lever.

10. A folding table comprising:
a tabletop, with a supporting device for the tabletop, comprising:
  a pull-out device for moving the supporting device for the tabletop from a substantially vertical stowing position into a substantially horizontal usage position via a substantially vertical pull-out position, wherein the pull-out device has a guiding device for guiding the supporting device between the substantially vertical stowing position and the substantially vertical pull-out position, wherein the supporting device comprises a supporting arm on each of two opposite sides of the tabletop, wherein the supporting arms are fixed to a bottom side of the tabletop, wherein the guiding device has a substantially linear first guide track for a first guide element on the supporting device and a second guide track for a second guide element on the supporting device, wherein the second guide track has a linear segment and an arcuate segment, wherein the supporting device is slid along the linear segment of the second guide track of the guiding device from the substantially vertical stowing position into the substantially vertical pull-out position and is pivoted from the substantially vertical pull-out position into the substantially horizontal usage position along the arcuate segment of the second guide track of the guiding device, wherein the arcuate segment of the second guide track of the guiding device has a central angle of substantially 90°, and wherein, in response to sliding the second guide element along the arcuate segment of the second guide track, the supporting device, together with the tabletop fastened thereto, is pivoted about the same angle of substantially 90°;
wherein the guiding device is connected to a drive unit, by means of which the supporting device is moved from the substantially vertical stowing position to the substantially horizontal usage position via the substantially vertical pull-out position;
wherein the drive unit is equipped to move the first guide element along the first guide track of the guiding device, wherein the second guide element is guided passively along the second guide track of the guiding device, and wherein the drive unit is an electric motor;
wherein the drive unit is equipped to set the first guide element into rotation, wherein, on the supporting device, the first guide element is connected to a power transmission element, by means of which the rotation of the first guide element is converted into a linear movement of the first guide element along the first guide track; and
wherein a gearwheel is provided as the power transmission element, wherein the gearwheel meshes with a toothed rack in response to the linear movement of the first guide element along the first guide track, and wherein the toothed rack has substantially a same length as the first guide track of the guiding device.

11. A folding table comprising:
a tabletop, with a supporting device for the tabletop, comprising:
  a pull-out device for moving the supporting device for the tabletop from a substantially vertical stowing position into a substantially horizontal usage position via a substantially vertical pull-out position, wherein the pull-out device has a guiding device for guiding the supporting device between the substantially vertical stowing position and the substantially vertical pull-out position, wherein the supporting device comprises a supporting arm on each of two opposite sides of the tabletop, wherein the supporting arms are fixed to a bottom side of the tabletop, wherein the guiding device has a substantially linear first guide track for a first guide element on the supporting device and a second guide track for a second guide element on the supporting device, wherein the second guide track has a linear segment and an arcuate segment, wherein the supporting device is slid along the linear segment of the second guide track of the guiding device from the substantially vertical stowing position into the substantially vertical pull-out position and is pivoted from the substantially vertical pull-out position into the substantially horizontal usage position along the arcuate segment of the second guide track of the guiding device, wherein the arcuate segment of the second guide track of the guiding device has a central angle of substantially 90°, and wherein, in response to sliding the second guide element along the arcuate segment of the second guide track, the supporting device, together with the tabletop fastened thereto, is pivoted about the same angle of substantially 90°;

wherein the guiding device is connected to a drive unit, by means of which the supporting device is moved from the substantially vertical stowing position to the substantially horizontal usage position via the substantially vertical pull-out position;

wherein the substantially linear first guide track of the guiding device and the linear segment of the second guide track of the guiding device extend substantially in a vertical direction; and wherein a cladding element is provided, which is pivoted between a first position, which closes a pull-out opening for the supporting device, and a second position, which releases the pull-out opening for the supporting device.

12. The folding table according to claim 11, wherein a switch for activating the drive unit is provided, which is operated by pivoting the cladding element.

13. The folding table according to claim 1, wherein the pull-out device has a tilt mechanism for tilting the guiding device for the supporting device from the substantially vertical stowing position into an initial position, which is inclined relative thereto.

* * * * *